No. 623,409. Patented Apr. 18, 1899.
W. I. LUDLOW.
WHEEL HUB.
(Application filed June 20, 1898.)
(No Model.)
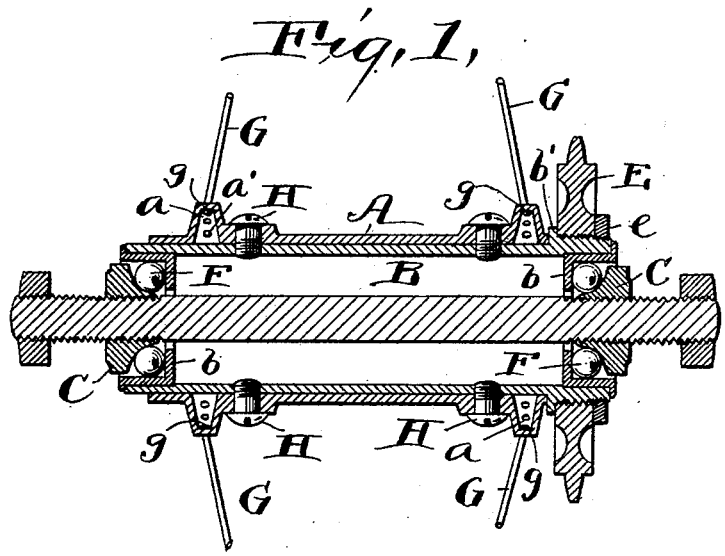
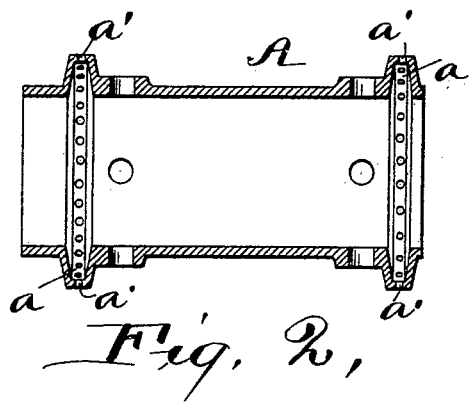
Witnesses.
E. B. Gilchrist
Philip E. Knowlton
Inventor.
Washington I. Ludlow
by his Attorneys,
Thurston & Bates

UNITED STATES PATENT OFFICE.

WASHINGTON I. LUDLOW, OF CLEVELAND, OHIO, ASSIGNOR OF ONE-HALF TO DANIEL R. TAYLOR, OF SAME PLACE.

WHEEL-HUB.

SPECIFICATION forming part of Letters Patent No. 623,409, dated April 18, 1899.

Application filed June 20, 1898. Serial No. 683,918. (No model.)

*To all whom it may concern:*

Be it known that I, WASHINGTON I. LUDLOW, a citizen of the United States, residing at Cleveland, in the county of Cuyahoga and State of Ohio, have invented a certain new and useful Improvement in Wheel-Hubs, of which the following is a full, clear, and exact description, reference being had to the accompanying drawings.

The invention relates particularly to the hub of a wheel suitable for use in a bicycle; and it consists in a hub composed of an inner tube, which carries the bearings, and an outer tube removably secured thereon, to which the wheel-spokes are connected; also, in the combination of an inner hub-tube with an outer hub-tube removably secured thereon and having internal grooves for the accommodation of the spoke ends and holes through which the spokes pass, and also in the more specific combinations of the parts shown and described, as pointed out in the claims.

In the drawings, Figure 1 is a longitudinal sectional view of a hub embodying my invention, and Fig. 2 is a similar view of the outer tube.

The hub consists of two tubes A and B, of which the former is removably fitted and secured upon the latter. The screws H are shown as the means for securing the hub-tubes together, but any other means suitable for preventing relative rotation and endwise movement may be employed instead of the screws.

In the ends of the inner tube B the ball-bearing cups $b$ are formed or secured. These cups, together with the cones C C on the axle, form the raceway for the balls F. The inner tube is longer than the outer tube in the case of the rear or driving wheel hub, which is the wheel-hub shown. On one end of this inner tube is an annular flange $b'$, which serves as an abutment or stop for the adjacent end of the outer tube A, and also for the sprocket or gear wheel E, which may be screwed onto the threaded end of said tube, and is locked by the nut $e$.

The outer tube is provided with internal recesses, preferably in the form of annular grooves $a$, which are adapted to receive the upset ends $g$ of the spokes G, said spokes passing through the holes $a'$. Because of the described construction the spokes may be easily attached to the hub, they will be stronger than in the common construction, wherein the spokes are bent at right angles to pass through transverse holes in an annular flange, and the spokes and hub may be more easily and completely cleaned.

The making of the hub of two separable tubes is of advantage for various other reasons, among which may be named the following: The bearings may be accurately adjusted before the inner tube is secured in place. When the wheel or outer hub or the bearings need repairing, the two parts may be separated while such repairs are under way.

Having described my invention, I claim—

1. The combination of the wheel-hub consisting of an inner tube containing ball-bearing cups in its ends, and an outer shorter tube which is removably secured upon the inner tube, said outer tube having near its ends internal annular perforated recesses, with spokes which pass through said perforations and have enlarged ends which lie in said recesses, and a driving-wheel secured to the projecting end of the inner hub-tube, substantially as specified.

2. In a wheel for bicycles and other vehicles, the combination of two tubes A and B of which the former is removably fastened upon the latter, the inner tube being the longer and having the external annular flange $b'$ and the bearing-cups in its ends, the outer tube having internal annular grooves and holes leading to said grooves, and a sprocket or gear wheel secured upon the end of said inner tube, substantially as specified.

In testimony whereof I hereunto affix my signature in the presence of two witnesses.

WASHINGTON I. LUDLOW.

Witnesses:
PHILIP E. KNOWLTON,
E. L. THURSTON.